US008203681B2

(12) United States Patent
Park et al.

(10) Patent No.: US 8,203,681 B2
(45) Date of Patent: Jun. 19, 2012

(54) IPS LCD METHOD AND DEVICE COMPRISING AN OUTERMOST COMMON ELECTRODE THAT IS WIDER IN A LOWER PORTION

(75) Inventors: Jeong Ki Park, Gumi-si (KR); Dae Young Seok, Daegu (KR)

(73) Assignee: LG Display Co., Ltd., Seoul (KR)

( * ) Notice: Subject to any disclaimer, the term of this patent is extended or adjusted under 35 U.S.C. 154(b) by 838 days.

(21) Appl. No.: 11/271,258

(22) Filed: Nov. 8, 2005

(65) Prior Publication Data

US 2007/0002244 A1    Jan. 4, 2007

(30) Foreign Application Priority Data

Jun. 30, 2005   (KR) .................. 10-2005-0057625

(51) Int. Cl.
  *G02F 1/1343*    (2006.01)
(52) U.S. Cl. ........................................ 349/141; 349/146
(58) Field of Classification Search .................. 349/141, 349/146
  See application file for complete search history.

(56) References Cited

U.S. PATENT DOCUMENTS

| 6,839,104 B2 * | 1/2005 | Taniguchi et al. | 349/106 |
| 7,092,049 B2 * | 8/2006 | Kadotani et al. | 349/110 |
| 2002/0075443 A1 * | 6/2002 | Shimizu et al. | 349/155 |
| 2002/0163604 A1 * | 11/2002 | Kim et al. | 349/43 |
| 2004/0125300 A1 * | 7/2004 | Lee | 349/141 |
| 2004/0227891 A1 * | 11/2004 | Hirota | 349/141 |
| 2005/0151913 A1 * | 7/2005 | Lai et al. | 349/141 |

FOREIGN PATENT DOCUMENTS

| CN | 1470907 A | 1/2004 |
| CN | 1595269 A | 3/2005 |
| KR | 1998-070767 | 10/1998 |

OTHER PUBLICATIONS

First Office Action for corresponding Chinese Patent Application Serial No. 2005101158333, dated Nov. 9, 2008.
Office Action issued in corresponding Taiwanese Patent Application No. 94140072; issued Mar. 17, 2009.
Office Action issued in corresponding Korean Patent Application No. 10-2005-0057625, mailed Sep. 5, 2011.

* cited by examiner

*Primary Examiner* — Jessica M Merlin
(74) *Attorney, Agent, or Firm* — Brinks Hofer Gilson & Lione

(57) ABSTRACT

An IPS mode LCD device is disclosed. The LCD device includes gate and data lines perpendicular to each other on a first substrate defining a pixel region. A thin film transistor is formed at an intersection portion of the gate and data lines. A common line is in parallel to the gate line. An outermost common electrode extends from the common line and is formed in the outermost portion of the pixel region. The outermost common electrode has a width below 8 μm. Common electrodes are formed in the pixel region and contact the common line. Pixel electrodes are formed in the pixel region and contact a drain electrode of the thin film transistor. Each pixel electrode is alternately formed with each common electrode. A liquid crystal layer is between the first substrate and an opposite second substrate.

24 Claims, 8 Drawing Sheets

IPS LCD METHOD AND DEVICE COMPRISING AN OUTERMOST COMMON ELECTRODE THAT IS WIDER IN A LOWER PORTION

This application claims the benefit of Korean Patent Application No. P2005-57625 filed on Jun. 30, 2005, which is hereby incorporated by reference as if fully set forth herein.

TECHNICAL FIELD

The present application relates to a liquid crystal display (LCD) device, and more particularly, to an In-Plane Switching (IPS) mode LCD device.

DISCUSSION OF THE RELATED ART

Recently, flat displays have been actively studied and researched. In particular, liquid crystal display (LCD) devices have attracted much attention. The LCD device operates by changing the optical anisotropy using the application of an electric field to a liquid crystal. The liquid crystal is both fluid and has optical characteristics that can be used in displays. The LCD device has been used as a substitute for a cathode ray tube (CRT) display as the LCD device has a thin profile, is lightweight and has low power consumption.

The LCD device has various modes according to the properties of liquid crystal and pattern structures. More specifically, the LCD device is categorized into a Twisted Nematic (TN) mode in which the liquid crystal directors are controlled by applying a voltage after the liquid crystal directors have been twisted at 90°, a multi-domain mode in which a wide viewing angle is obtained by dividing one pixel into several domains, an Optically Compensated Birefringence (OCB) mode in which a phase change of light is compensated for according to the progressing direction of light by forming a compensation film on an outer surface of a substrate, an In-Plane Switching (IPS) mode in which a transverse electric field parallel is created by forming two electrodes that carry different voltages on a substrate, and a Vertical Alignment (VA) mode in which a longitudinal (major) axis of the liquid crystal molecules is arranged vertical to a plane of an alignment layer by using a negative type liquid crystal and vertical alignment layer.

Among these devices, the IPS mode LCD device includes a color filter array substrate, a thin film transistor TFT array substrate, and a liquid crystal layer. The color filter array substrate and the thin film transistor array substrate are positioned opposite to each other, and the liquid crystal layer is formed between the two substrates. The color filter array substrate includes a black matrix layer for preventing light leakage, and a R, G and B color filter layer for realizing various colors. Also, the thin film transistor TFT array substrate includes gate and data lines intersecting each other to define a pixel region, a switching device formed at an intersection point of the gate and data lines, and common and pixel electrodes alternately formed to generate a transverse electric field.

Hereinafter, an IPS mode LCD device according to the related art will be described as follows.

FIG. 1 is a plan view of a unit pixel region of an IPS mode LCD device according to the related art. FIG. 2 is a cross sectional view along I-I' of FIG. 1. FIG. 3 shows the transmissivity in an IPS mode LCD device according to the related art.

As shown in FIG. 1 and FIG. 2, the IPS mode LCD device according to the related art includes a TFT array substrate 111. On the TFT array substrate 111, there are a plurality of gate lines 112, a plurality of data lines 115, a common line 125, a plurality of common electrodes 124, a plurality of pixel electrodes 117, and a plurality of thin film transistors TFTs. The plurality of gate lines 112 are formed in one direction at fixed intervals, and the plurality of data lines 115 are formed perpendicular to the gate lines 112, thereby defining a plurality of pixel regions. The common line 125 is formed parallel to the gate line. Also, the plurality of common electrodes 124 are formed in each pixel region. The common electrodes 124 are connected with the common line 125 by a second contact hole 119 to receive a Vcom signal from an external driving circuit. The pixel electrode 117 alternates with the common electrode 124 in the pixel region, thereby forming a transverse electric field. Also, the plurality of thin film transistors TFT are formed at intersection portions of the gate and data lines. The thin film transistor is turned on according to a scan signal of the gate line, to transmit a data signal of the data line 115 to the pixel electrode 117.

In addition, outermost common electrodes 125a, extending from the common line 125, are formed at both edges of the data line 115. The D.C. signal is applied to the outermost common electrodes 125a. The outermost common electrodes 125a prevent the transverse electric field between the common electrode 124 and the pixel electrode 117 from being distorted with the A.C. signal of the data line 115. That is, the outermost common electrodes 125a and the adjacent pixel electrode 117 generate the transverse electric field. Simultaneously, the outermost common electrodes 125a prevent interference from the adjacent data line 115.

The common electrode 124 adjacent to the data line 115 partially overlaps the outermost common electrode 125a. The overlapped portion "A" between the outermost common electrode 125a and the common electrode 124 has a step coverage due to the thickness of each of layers. A width of the outermost common electrode 125a is more than 10 μm. In the IPS mode LCD device, alignment layers (not shown) are formed on inner surfaces of the TFT array substrate 111 and the color filter array substrate 121, so as to determine the initial alignment direction of liquid crystal molecules.

That is, polyamic acid or soluble polyimide is coated on the substrate, and sequentially cured at a temperature between 60° C. and 80° C. and between 80° C. and 200° C., whereby the coated polyamic acid or soluble polyimide is formed to create a polyimide layer. Then, various alignment patterns are formed in the surface of the polyimide layer by performing a rubbing process using a rubbing roll. The rubbing process progresses by rotating the rubbing roll, which is coated with rubbing cloth such as nylon or rayon, so that the surface of the polyimide layer is rubbed mechanically.

As high polymer chains of the alignment layer are arranged in a constant direction, it is possible to align the liquid crystal molecules in the constant direction. In this respect, to the rubbing process obtains a uniform rubbing direction over the entire area.

However, as an overlapped portion "A" is present between the outermost common electrode 125a and the common electrode 124, the rubbing cloth may not contact the edge of the step coverage. Accordingly, as shown in FIG. 3, the liquid crystal molecules 131a of the portion that is not rubbed are disordered.

Furthermore, the liquid crystal molecules are disordered in the portion between the data line 115 and the outermost common electrode 125a, due to the electric field distortion and the defective rubbing generated by the step coverage.

Due to the disordered arrangement of the liquid crystal molecules, control of the transmissivity of light in the corresponding portion is difficult at best, causing the transmissivity of light to be non-uniform. Thus, as shown in FIG. 2, a black matrix layer 122 is formed to prevent light leakage. However, since the black matrix layer 122 is formed of a light-shielding material, the aperture ratio is decreased as the size of the black matrix layer increases. As shown in FIG. 3, light leakage may be generated between black matrix patterns of the black matrix layer due to the non-uniformity of transmitted light.

Light leakage does not generally cause problems when the LCD is in a white state. However, as shown in FIGS. 4A and 4B, when the LCD is in a black state, light leakage causes a bright picture image to be displayed. That is, the contrast ratio, which is calculated as the ratio of the white state luminance to the black state luminance, may be deteriorated.

FIG. 4A is a photograph showing the II region of FIG. 1, and FIG. 4B is a photograph showing the III region of FIG. 1. As shown in FIGS. 4A and 4B, light leakage is generated along the outermost common electrode.

The related art IPS mode LCD device has the following disadvantages.

In the overlapped portion "A" between the outermost common electrode 125a and the common electrode 124, light leakage is generated due to defective rubbing caused by the step coverage of the patterns and the disclination. When the LCD is in the black state, this light leakage causes a bright picture image, thereby lowering the contrast ratio. Thus, the picture quality is deteriorated.

In addition, the outermost common electrode 125a is formed at the edge of the data line 115 to prevent the transverse electric field between the common electrode 125 and the pixel electrode 117 from being distorted with the A.C. signal of the data line 115. However, as the width of the outermost common electrode 125a is increased, the aperture ratio is decreased.

BRIEF SUMMARY

In one embodiment, an IPS mode LCD device includes gate and data lines formed perpendicular to each other on a first substrate to define a pixel region; a thin film transistor at an intersection of the gate and data lines; a common line; an outermost common electrode extending from the common line, formed in an outermost portion of the pixel region, the outermost common electrode having a width below 8 µm; a plurality of common electrodes formed in the pixel region and contacting the common line; a plurality of pixel electrodes formed in the pixel region and contacting a drain electrode of the thin film transistor, wherein each pixel electrode is alternately formed with each common electrode; and a liquid crystal layer between the first substrate and an opposite second substrate.

In another embodiment, an in-plane switching mode liquid crystal display device comprises: a first substrate containing common electrodes, a pixel electrode between the common electrodes, an outermost common electrode that partially overlaps one of the common electrodes such that an overlap edge is formed, and a rubbed alignment layer disposed on the outermost common electrode and the one of the common electrodes such that the rubbed alignment layer is formed over the overlap edge; and a second substrate containing a black matrix layer disposed in relation to the overlap edge such that the black matrix layer completely prevents light leakage generated by defective rubbing at the overlap edge.

In another embodiment, a method of forming an in-plane switching mode liquid crystal display device is disclosed. The method comprises: forming a gate line and a data line perpendicular to the gate line to form a pixel region on a first substrate; forming a common line in the pixel region and an outermost common electrode extending from the common line, the outermost common electrode adjacent to the data line and having a width below 8 µm; forming common electrodes that contact the common line; forming a thin film transistor at an intersection of the gate and data lines; and forming a pixel electrode that contacts a drain electrode of the thin film transistor and is disposed between the common electrodes.

In other embodiments, the critical dimension CD of the outermost common electrode is 8 µm, preferably, about 6 µm. In this case, it is possible to obtain a contrast ratio of about 900 to 1. Also, since the outermost common electrode is formed of the opaque metal layer, it is possible to improve the aperture ratio with a decrease in the width of the outermost common electrode if the margin width of the outermost common electrode is decreased to about 6 µm. That is, when the width of outermost common electrode is decreased to about 6 µm, the aperture ratio is improved by about 2%.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain principles of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, an IPS mode LCD device according to the present invention will be described with reference to the accompanying drawings.

Figure 5:
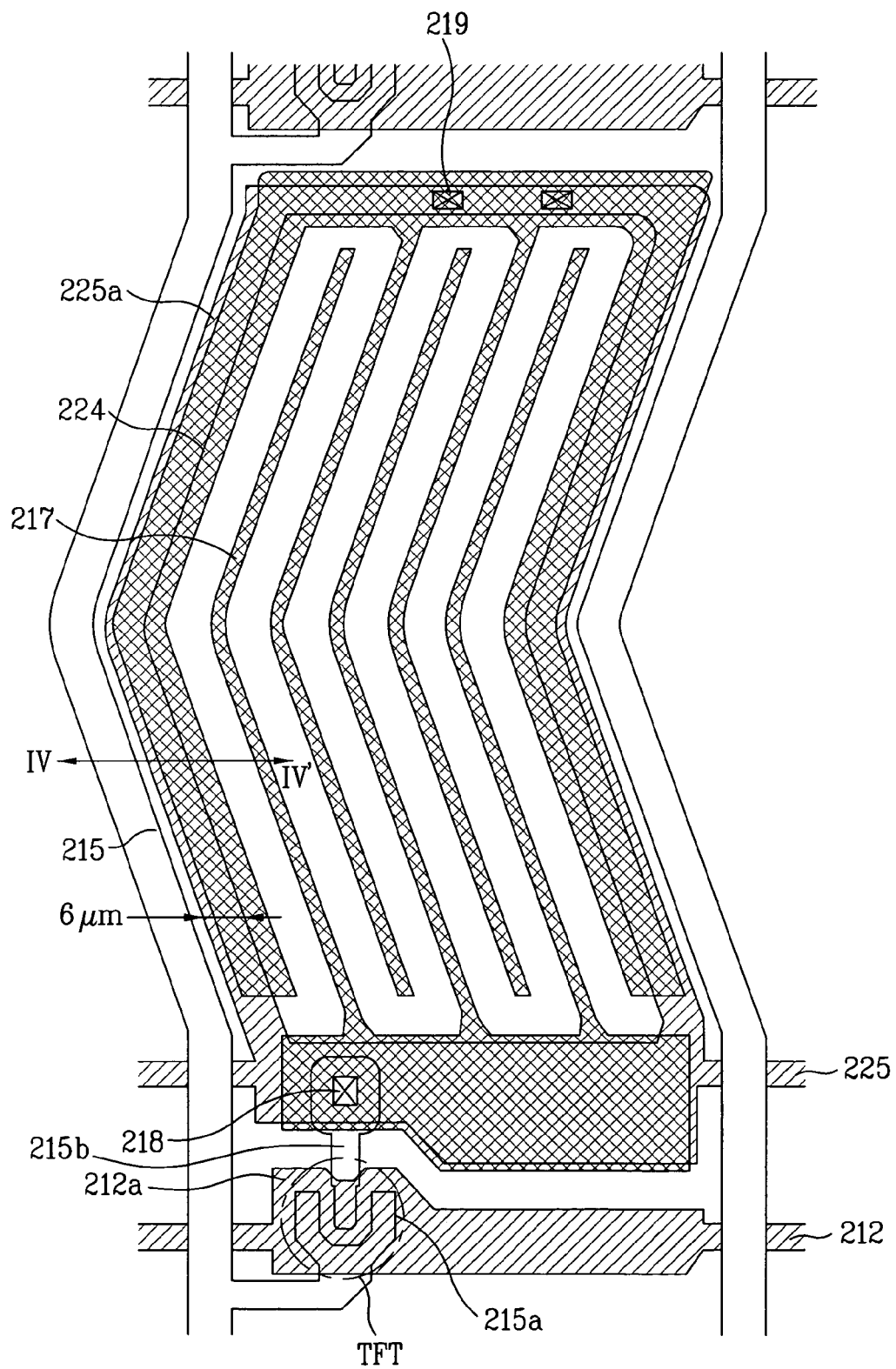
FIG. 5 is a plan view of a unit pixel region of an IPS mode LCD device according to the first embodiment of the present invention.
Figure 6:
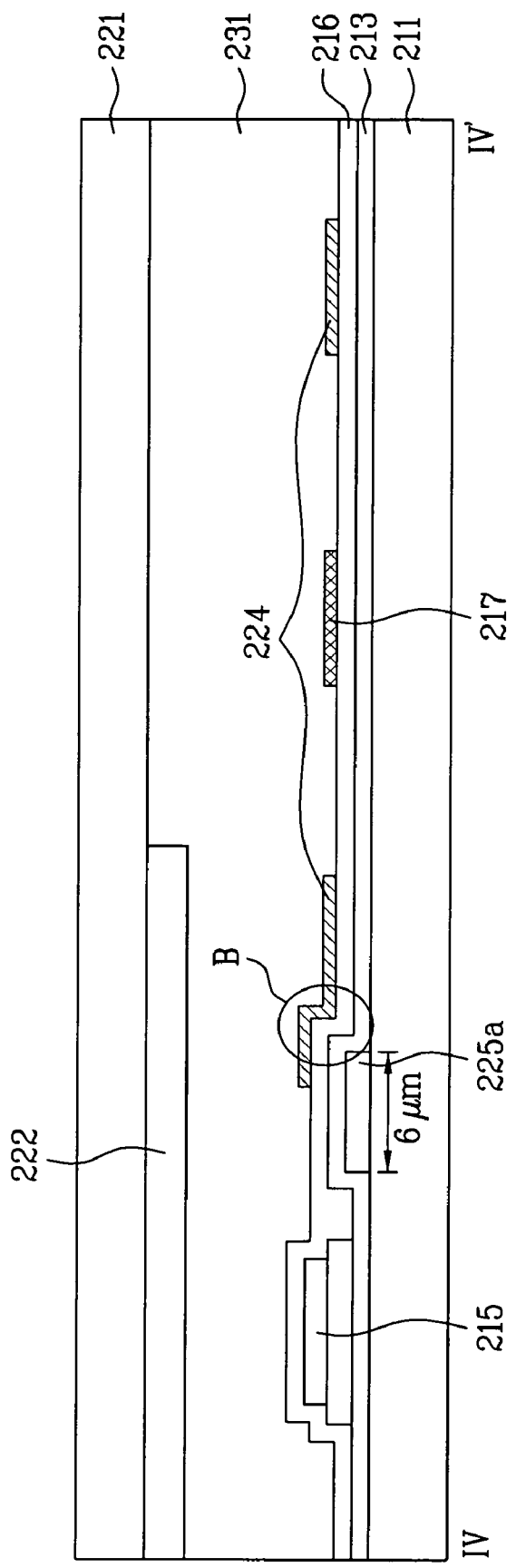
FIG. 6 is a cross sectional view along IV-IV' of FIG. 5.
Figure 7:
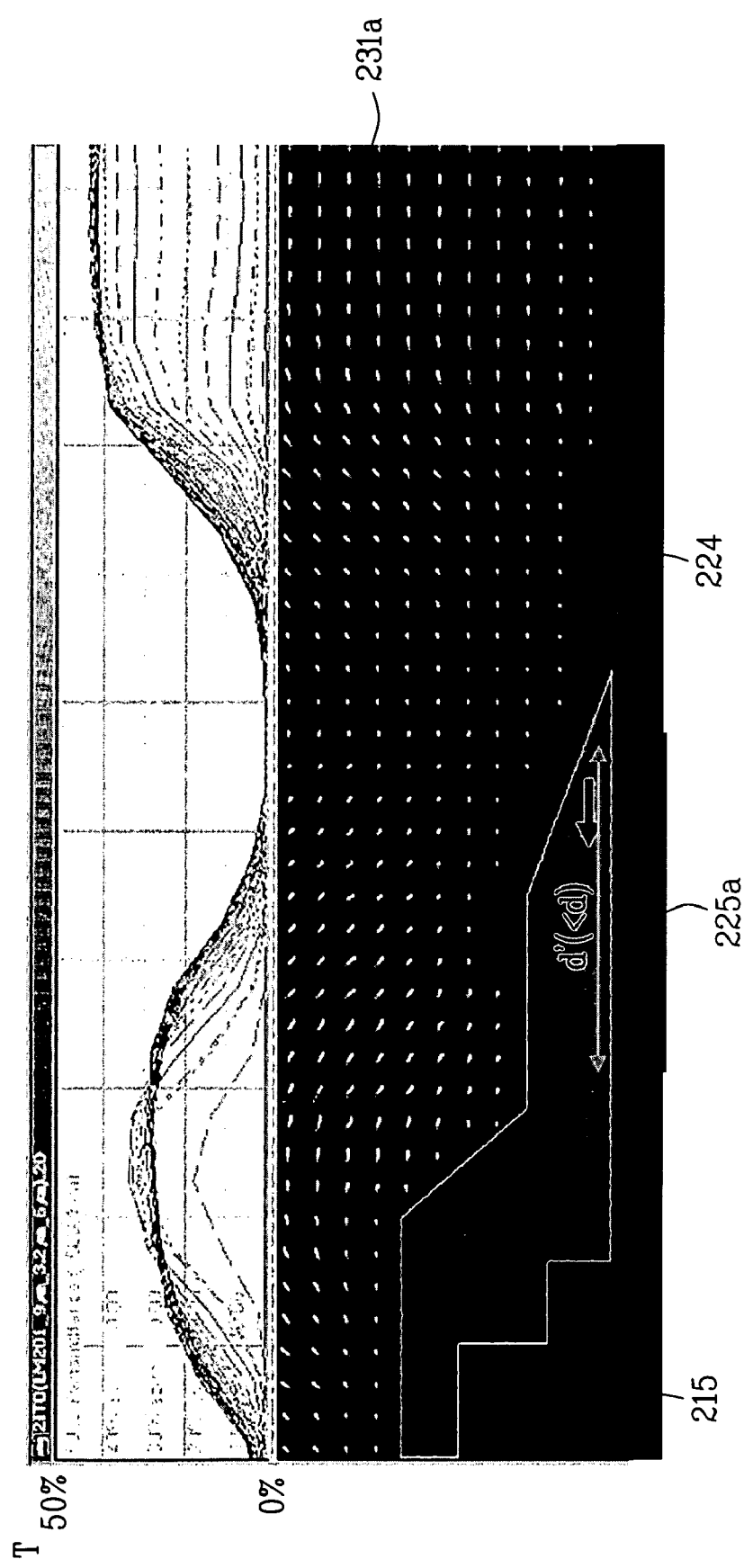
FIG. 7 shows the transmissivity in an IPS mode LCD device according to the present invention.

FIG. 5 is a plan view of a unit pixel region of an IPS mode LCD device according to the present invention. FIG. 6 is a cross sectional view along IV-IV' of FIG. 5. FIG. 7 shows the transmissivity in an IPS mode LCD device according to the present invention.

As shown in FIG. 5 and FIG. 6, a TFT array substrate of an IPS mode LCD device according to the present invention includes a plurality of gate lines 212, a plurality of data lines 215, a common line 225, an outermost common electrode 225a, a plurality of common electrodes 224, a plurality of thin film transistors TFTs, and a plurality of pixel electrodes 217.

The plurality of gate lines 212 are formed at fixed intervals in one direction, and the plurality of data lines 215 are perpendicular to the gate lines 212 so as to define a plurality of pixel regions. The common line 225 is parallel to the gate line 212. The outermost common electrode 225a, extending from the common line 225, is formed in the outermost portion of the pixel region adjacent to the data line 215. The width of outermost common electrode 225a is below 8 µm.

The plurality of common electrodes 224 are formed in each of the pixel regions. The common electrode 224 contacts the common line 225 using a second contact hole 219 to receive a Vcom voltage. The plurality of thin film transistors TFTs are formed at respective intersection portions of the gate and data lines 212 and 215. Each of the thin film transistors TFT functions as a switching device. The plurality of pixel electrodes 217 are formed in each of the pixel regions. The pixel electrode 217 is in contact with a drain electrode 215b of the thin film transistor TFT using a first contact hole 218. The pixel electrode 217 is parallel to the common electrode 224, to form a transverse electric field. The outermost common electrode 225a has a width of about 6 µm.

A color filter array substrate 221 opposes the TFT array substrate 211. The color filter array substrate 221 includes a black matrix layer 222, a color filter layer (not shown) containing R, G and B patterns, and an overcoat layer (not shown). The black matrix layer 222 corresponds with the edge of the pixel region having the gate line 212 and thin film transistor TFT. The color filter layer is formed on the black matrix layer to represent various colors. The overcoat layer protects the color filter layer and planarizes the entire surface of the color filter array substrate 221.

In addition, a liquid crystal layer is formed between the TFT array substrate 211 and the color filter array substrate 221. Also, alignment layers (not shown) are formed on inner surfaces of the TFT array substrate 211 and the color filter array substrate 221, to determine the initial alignment direction of the liquid crystal layer. In order to form the alignment layers, polyimic acid is coated on the entire surface of the substrate, and is cured at a high temperature, whereby the coated polyimic acid is formed as a polyimide layer. Then, the polyimide layer is rubbed with a rubbing roll, thereby obtaining anisotropy in the polyimide layer.

Figure 1:
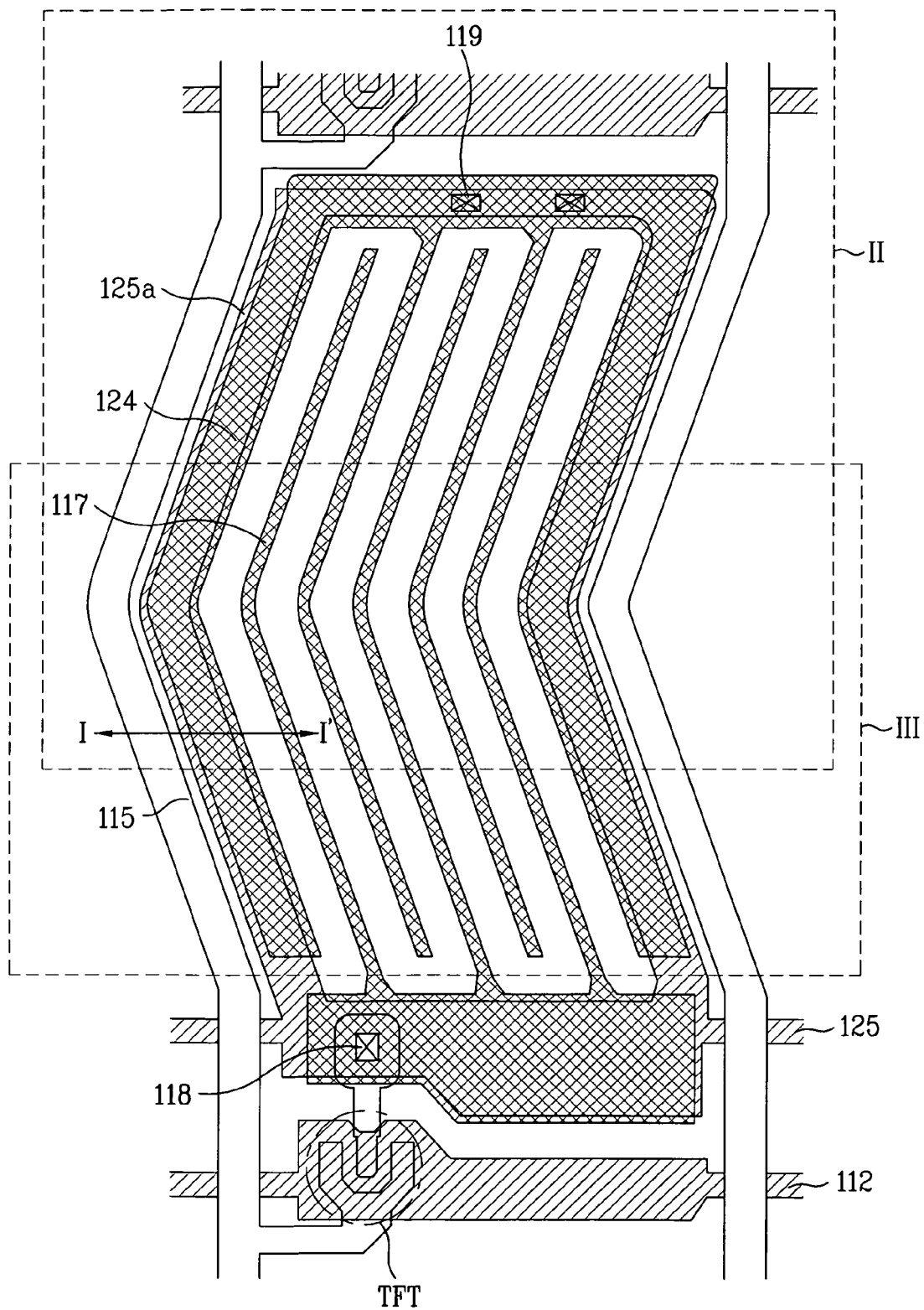
FIG. 1 is a plan view of a unit pixel region of an IPS mode LCD device according to the related art.
Figure 2:
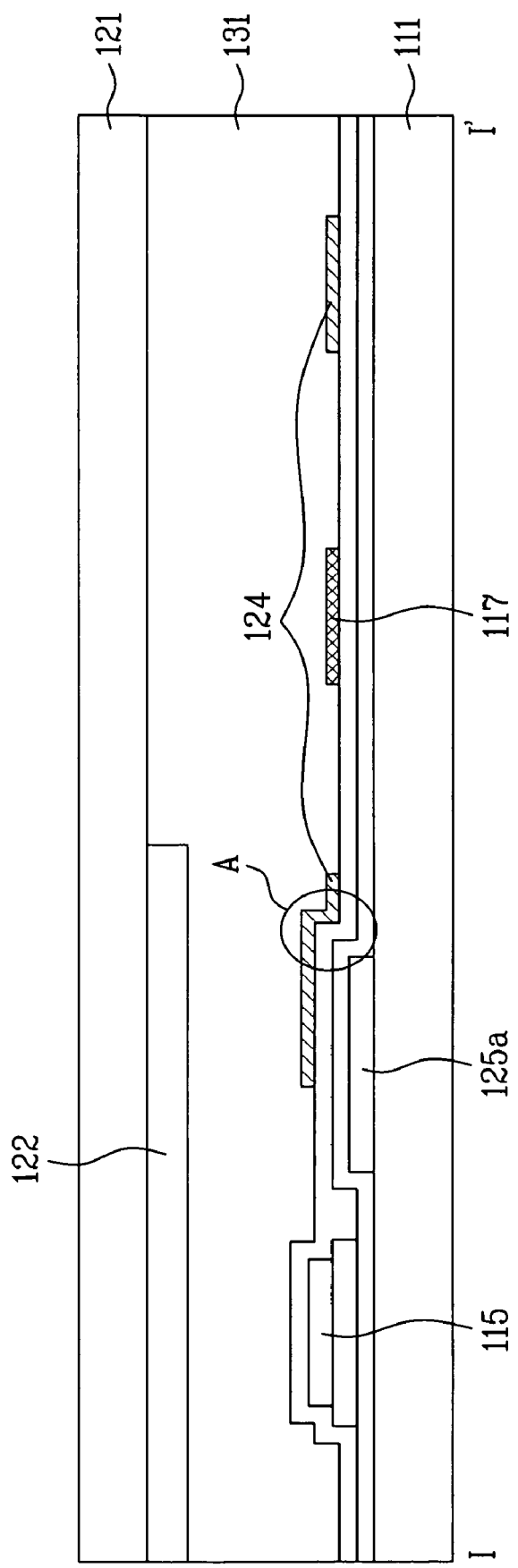
FIG. 2 is a cross sectional view along I-I' of FIG. 1.
Figure 3:
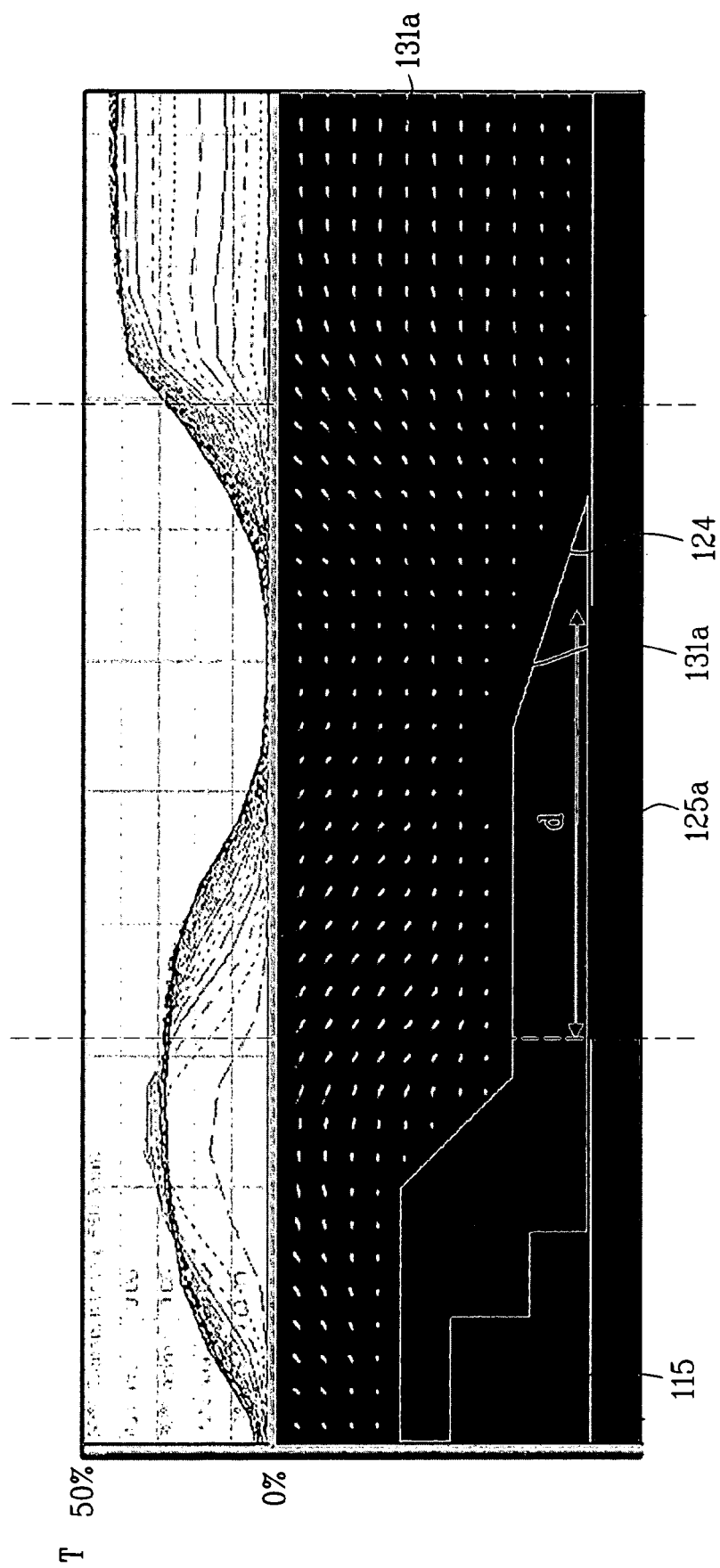
FIG. 3 shows the transmissivity in an IPS mode LCD device according to the related art.
Figure 4A:
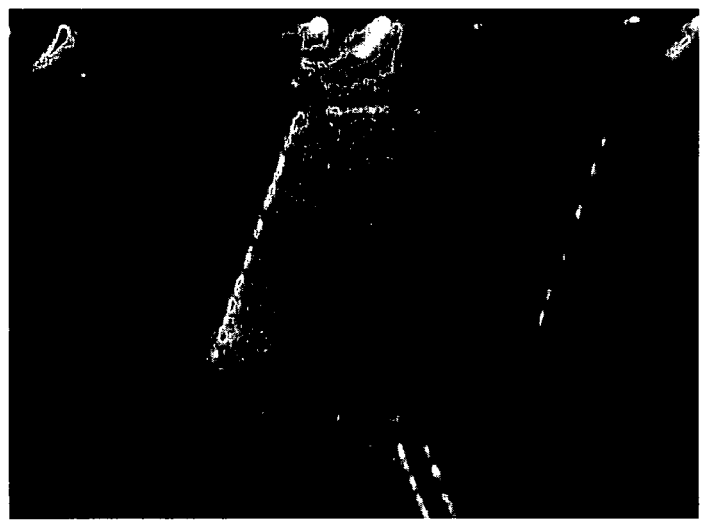
FIGS. 4A and 4B are photographs of the II and III regions of FIG. 1 showing light leakage.
Figure 4B:
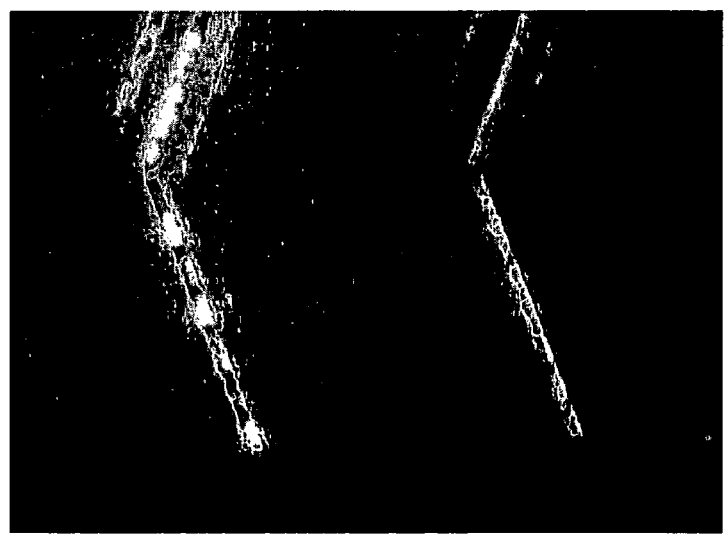

In the IPS mode LCD device, the entire width of the outermost common electrode 225a is decreased. More specifically, at least the width of the portion of the outermost common electrode 225a that overlaps the common electrode 224 is decreased. In comparison with the related art, the step coverage "B" which is the overlapped portion between the outermost common electrode 225a and the common electrode 224 is shifted towards the data line 215. In other words, an edge of the outermost common electrode 225a that overlaps the common electrode 224 is shifted toward the data line 215 with respect to the prior art. That is, the width (d) of outermost common electrode 125a in FIG. 3 is decreased to the width (d') of outermost common electrode 225a in FIG. 7, whereby the step coverage between the outermost common electrode 225a and the common electrode 224 is shifted towards the data line 215. As a result, the black matrix layer 222 completely prevents light leakage generated in the step coverage caused by defective rubbing.

As shown in FIG. 7, as the width of outermost common electrode 225a decreases, it is possible to decrease the light transmissivity in correspondence with the outermost common electrode 225a. That is, the luminance is lowered in the black state.

The critical dimension CD of the outermost common electrode 225a is decreased to about 6 µm, so that it is possible to improve the contrast ratio to about 900 to 1. As above, the contrast ratio is calculated as the ratio of the white state luminance to the black state luminance.

The outermost common electrode 225a and the common line 225 are formed in the same layer as the gate line 212. To form the outermost common electrode 225a and the common line 225, a metal layer of copper Cu, aluminum Al, aluminum neodymium AlNd, molybdenum Mo, chrome Cr, titanium Ti, tantalum Ta or molybdenum-tungsten MoW is deposited on the substrate 211, and then is patterned. In the related art, the outermost common electrode 125a has a minimum width of 8 µm. However, as described herein, the outermost common electrode 225a has a minimum width of about 6 µm. Accordingly, it is possible to improve the aperture ratio by decreasing the width of the outermost common electrode 225a.

The common electrode 224 and the pixel electrode 217 are formed in the same position and margin as those of the related art. The common electrode 224 and the pixel electrode 217 are formed by depositing and patterning a transparent conductive material such as ITO (Indium-Tin-Oxide) or IZO (Indium-Zinc-Oxide).

A gate insulating layer 213 is formed on the entire surface of the substrate between the gate line 212 and the data line 215. Then, a passivation layer 216 is formed on the entire surface of the substrate between the data line 215 and the pixel electrode 217.

For reference, the thin film transistor TFT is comprised of a gate electrode 212a, the gate insulating layer 213, a semiconductor layer (not shown), and source and drain electrodes 215a and 215b. The gate electrode 212a is formed in a predetermined portion of the gate line 212, and the gate insulating layer 213 is formed on the entire surface of the substrate 211 including the gate electrode 212a. Also, the semiconductor layer (not shown) is formed on the gate insulating layer above the gate electrode 212a. The source and drain electrodes 215a and 215b are formed on the semiconductor layer. The source and drain electrodes 215a and 215b extend from the data line 215. Then, the passivation layer 216 is formed on the entire surface of the substrate 211 including the thin film transistor TFT.

Figure 8:
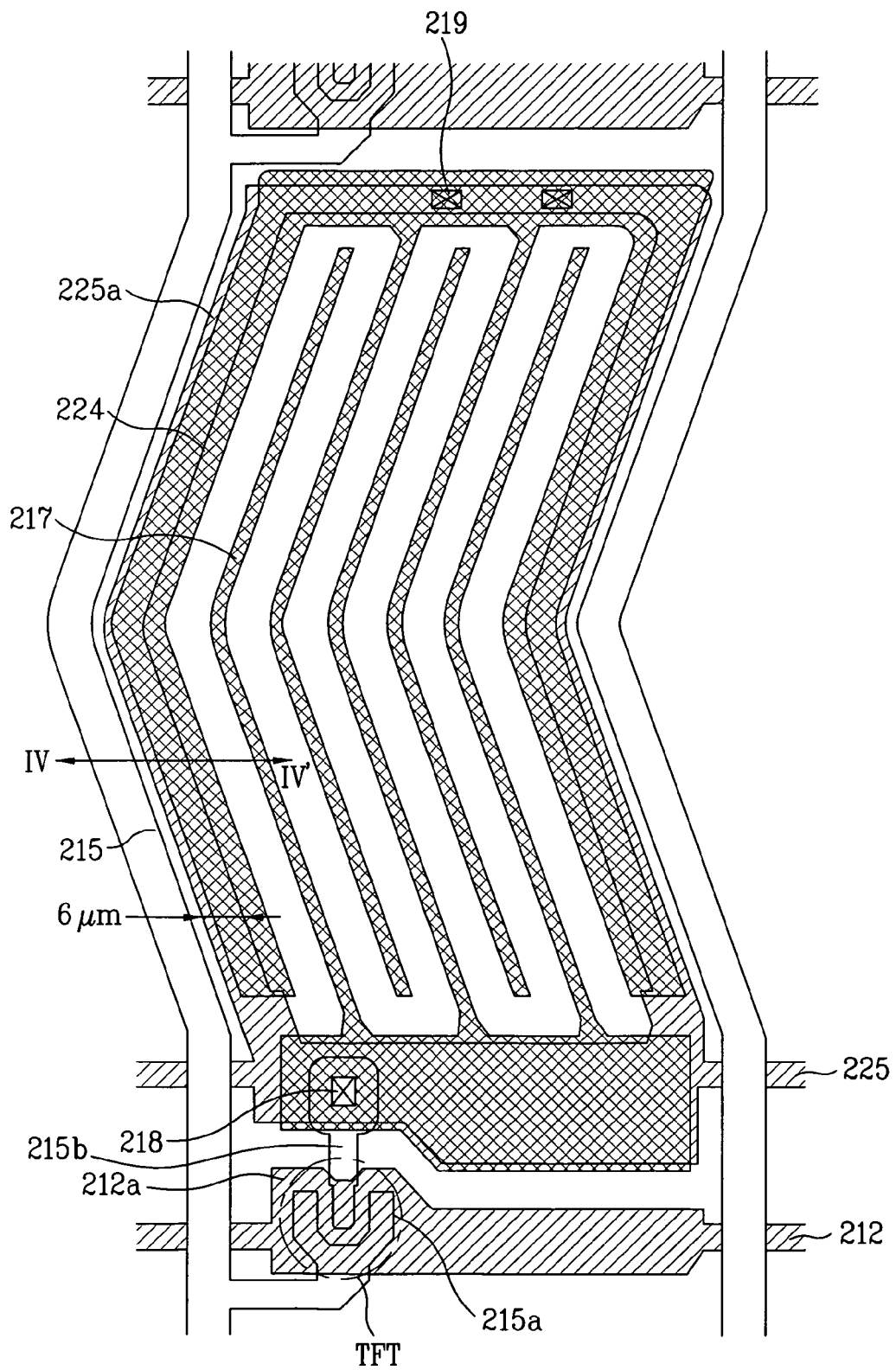
FIG. 8 is a plan view of a unit pixel region of an IPS mode LCD device according to the second embodiment of the present invention.

Also, FIG. 8 is a plan view of a unit pixel region of an IPS mode LCD device according to the second embodiment of the present invention.

As shown in FIG. 8, a width of the portion of the outermost common electrode 225a that overlaps with the common electrode 224 is narrower than the portion of the outermost common electrode 225a that does not overlap with the common electrode 224. That is, as shown the portion of the outermost common electrode 225a between the common line 225 and the end of the common electrode 224 proximate to the common line 225 is wider than the portion of the outermost common electrode 225a between substantially the end of the common electrode 224 proximate to the common line 225 and the end of the common electrode 224 distal from the common line 225.

Although not shown, the TFT array substrate is bonded to the color filter array substrate having the black matrix layer, the color filter layer and the overcoat layer, and then the liquid crystal layer is formed between the TFT array substrate and the color filter array substrate.

Then, first and second polarizing sheets are formed on outer surfaces of the TFT array substrate and the color filter array substrate. The transmission axes of the first and second polarizing sheets are perpendicular to each other. The initial alignment direction of liquid crystal is parallel to the transmission axis of any one polarizing sheet, whereby it is represented as a normally black mode.

As mentioned above, the IPS mode LCD device includes an outermost common electrode, which prevents the transverse electric field between the pixel electrode and the common electrode from being distorted due to the A.C. signal of the data line. In the IPS mode LCD device, the critical dimension CD of the outermost common electrode is below 8 μm. Thus, it is possible to improve the contrast ratio and the aperture ratio by optimizing the critical dimension CD of the outermost common electrode.

That is, the step coverage, the overlapped portion between the outermost common electrode and the common electrode, is shifted to the data line, whereby the black matrix layer completely prevents light leakage generated by defective rubbing. Accordingly, the luminance is lowered in the black state, thereby improving the contrast ratio.

When the outermost common electrode has a width of about 6 μm, it is possible to improve the contrast ratio of about 900 to 1. Also, since the outermost common electrode is formed of an opaque metal layer, the aperture ratio increases as the area of the outermost common electrode decreases if the margin width of the outermost common electrode is decreased to about 6 μm. That is, when the width of outermost common electrode is decreased to about 6 μm, the aperture ratio is improved by about 2%.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-plane switching mode liquid crystal display device comprising:
    gate and data lines defining a pixel region on a first substrate;
    a thin film transistor at an intersection of the gate and data lines;
    a common line;
    an outermost common electrode extending from the common line, formed in an outermost portion of the pixel region, the outermost common electrode having a width below 8 μm, wherein the outermost common electrode is not overlapped with the data line;
    a plurality of common electrodes formed in the pixel region and contacting the common line;
    a plurality of pixel electrodes formed in the pixel region and contacting a drain electrode of the thin film transistor, the pixel electrodes alternating with the common electrodes; and
    a liquid crystal layer between the first substrate and an opposite second substrate,
    wherein the common line and the outermost common electrode are formed in the same layer as the gate line, and the plurality of common electrodes are formed in the same layer as the pixel electrodes,
    wherein the outermost common electrode comprises an upper portion and a lower portion, the lower portion disposed more proximate to the common line than the upper portion,
    wherein the common electrode adjacent to the data line overlaps the upper portion of the outermost common electrode, and
    wherein a width of the lower portion is wider than a width of the upper portion.

2. The in-plane switching mode liquid crystal display device of claim 1, wherein the common electrode is formed in the same layer as the pixel electrode.

3. The in-plane switching mode liquid crystal display device of claim 1, wherein the common electrode and the pixel electrode include at least one of indium tin oxide or indium zinc oxide.

4. The in-plane switching mode liquid crystal display device of claim 1, wherein the outermost common electrode has a width of about 6 μm.

5. The in-plane switching mode liquid crystal display device of claim 1, wherein a contrast ratio of the in-plane switching mode liquid crystal display device is about 900 to 1.

6. An in-plane switching mode liquid crystal display device comprising:
    a first substrate containing common electrodes, a pixel electrode between the common electrodes, an outermost common electrode including an upper portion and a lower portion, the upper portion partially overlapping one of the common electrodes such that an overlap edge is formed, and a rubbed alignment layer disposed on the outermost common electrode and the one of the common electrodes such that the rubbed alignment layer is formed over the overlap edge, wherein the outermost common electrode is not overlapped with a data line and wherein the lower portion is disposed more proximate to a common line than the upper portion; and
    a second substrate containing a black matrix layer disposed in relation to the overlap edge such that the black matrix layer completely prevents light leakage generated by defective rubbing at the overlap edge, and
    wherein a width of the lower portion is wider than a width of the upper portion, and the plurality of common electrodes are formed in the same layer as the pixel electrodes.

7. The in-plane switching mode liquid crystal display device of claim 6, wherein the outermost common electrode has a width below 8 μm.

8. The in-plane switching mode liquid crystal display device of claim 7, wherein the outermost common electrode has a width of about 6 μm.

9. The in-plane switching mode liquid crystal display device of claim 6, wherein the first substrate further comprises a gate line formed in the same layer as the outermost common electrode.

10. The in-plane switching mode liquid crystal display device of claim 6, wherein the pixel electrode is formed in the same layer as the common electrodes.

11. The in-plane switching mode liquid crystal display device of claim 10, wherein the common electrodes and the pixel electrode include at least one of indium tin oxide or indium zinc oxide.

12. The in-plane switching mode liquid crystal display device of claim 6, wherein a contrast ratio of the in-plane switching mode liquid crystal display device is about 900 to 1.

13. A method of forming an in-plane switching mode liquid crystal display device, the method comprising:
    forming a gate line and a data line perpendicular to the gate line to form a pixel region on a first substrate;
    forming a common line in the pixel region and an outermost common electrode extending from the common line, the outermost common electrode adjacent to the data line and having a width below 8 µm, wherein the outermost common electrode is not overlapped with the data line;

forming common electrodes that contact the common line;

forming a thin film transistor at an intersection of the gate and data lines; and forming a pixel electrode that contacts a drain electrode of the thin film transistor and is disposed between the common electrodes, wherein the common line and the outermost common electrode are formed in the same layer as the gate line, and the plurality of common electrodes are formed in the same layer as the pixel electrodes, wherein the outermost common electrode comprises an upper portion and a lower portion, the lower portion disposed more proximate to the common line than the upper portion, wherein the common electrode adjacent to the data line overlaps the upper portion of the outermost common electrode, and wherein a width of the lower portion is wider than a width of the upper portion.

14. The method of claim 13, further comprising forming a black matrix layer and a color filter layer on a second substrate, the black matrix layer corresponding with an edge of the pixel region having the gate line and the thin film transistor.

15. The method of claim 14, further comprising forming an alignment layer on each of the first and second substrates and subsequently forming a liquid crystal layer between the first and second substrates, the alignment layers determining an initial alignment direction of the liquid crystal layer.

16. The method of claim 15, wherein formation of the alignment layers on each of the first and second substrates comprises forming a polyimide layer and rubbing the polyimide layer with a rubbing roll.

17. The method of claim 16, wherein formation of the polyimide layer comprises coating polyimic acid on the entire surface of the substrate and curing the polyimic acid to form the polyimide layer.

18. The method of claim 16, wherein the outermost common electrode partially overlaps one of the common electrodes such that an overlap edge is formed.

19. The method of claim 18, wherein the black matrix layer is disposed in relation to the overlap edge such that the black matrix layer completely prevents light leakage generated by defective rubbing at the overlap edge.

20. The method of claim 18, wherein a width of the outermost common electrode between the common line and an end of the one of the common electrodes proximate to the common line is wider than a width of the outermost common electrode between an end of the one of the common electrodes distal to the common line and substantially the end of the one of the common electrodes proximate to the common line.

21. The method of claim 13, wherein the outermost common electrode has a width of about 6 µm.

22. The method of claim 13, wherein the pixel electrode is formed in the same layer as the common electrodes.

23. The method of claim 13, wherein the common electrodes and the pixel electrode include at least one of indium tin oxide or indium zinc oxide.

24. The method of claim 13, wherein a contrast ratio of the in-plane switching mode liquid crystal display device is about 900 to 1.

* * * * *